July 17, 1956

W. S. LESNER 2,754,595

COMBINED SQUARE AND GAUGE BLOCK

Filed June 30, 1952

INVENTOR.
WILLIAM S. LESNER.

BY

ATTORNEY.

July 17, 1956  W. S. LESNER  2,754,595
COMBINED SQUARE AND GAUGE BLOCK
Filed June 30, 1952  2 Sheets-Sheet 2

INVENTOR.
WILLIAM S. LESNER.
BY Louis Chayka
ATTORNEY.

United States Patent Office 2,754,595
Patented July 17, 1956

2,754,595

COMBINED SQUARE AND GAUGE BLOCK

William S. Lesner, Detroit, Mich.

Application June 30, 1952, Serial No. 296,329

2 Claims. (Cl. 33—112)

The purpose of my invention is to provide a device for use of mechanics, which device may serve both as a means of checking squareness of a work piece and as a means of ascertaining linear measurements thereof.

A further object of my improvement is to provide a device which within the limits of its capacity may be used in conjunction with steel parallels or gauge blocks, such as Johannson, Hoke, or Van Keuren blocks, to locate work with extreme accuracy.

A further object of my improvement is to provide a device which for the purpose of checking squareness is provided with a portion tapered to a narrow arcuate surface or working edge for contact with an object to be tested, the tapered portion being adapted to be used in confined spaces which could not be otherwise conveniently reached.

This and other objects of which the device is capable will become obvious in the light of my description drawn with reference to the accompanying drawings in which.

Similar numerals refer to similar parts throughout the several views.

The block is made of one solid piece of steel stock and comprises a thick body portion generally indicated by numeral 10 and bounded by two broad surfaces 11 disposed parallel to each other. When the block is in its normal operative position said flat surfaces are disposed in vertical planes. The lower end of the block serves as its base 12, while the upper surface of the block forms its top 13.

Figure 2:
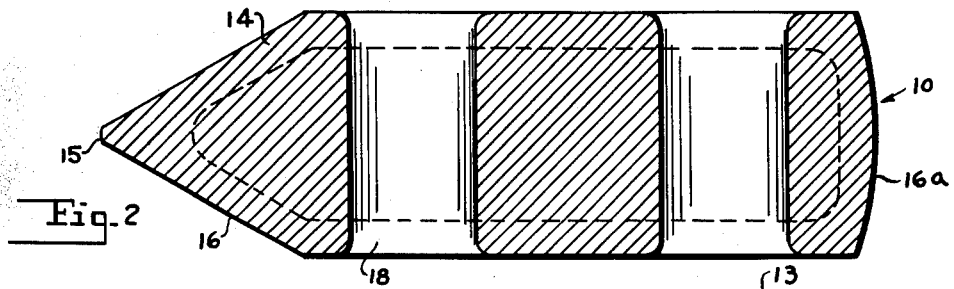
Fig. 2 is a sectional view thereof taken on line 2—2 of Fig. 1.
Figure 1:
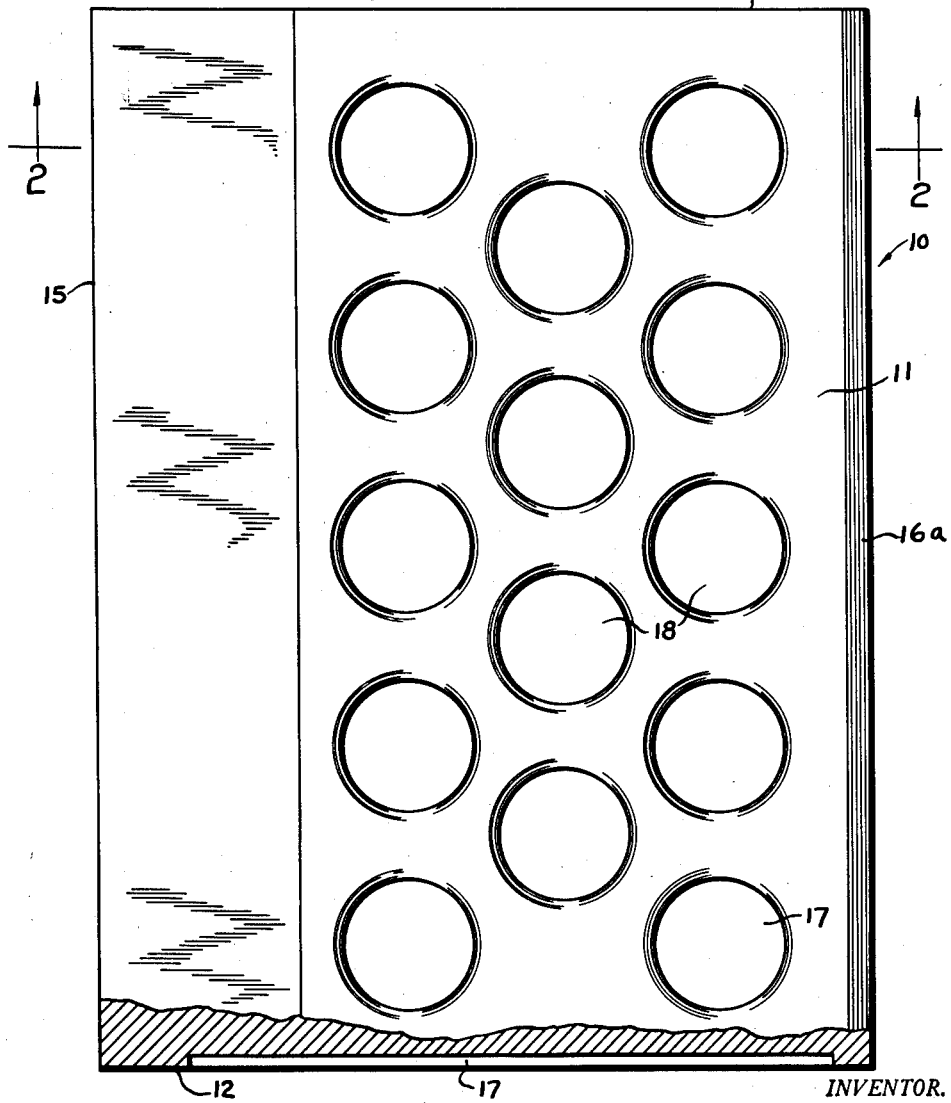
Fig. 1 is a side elevational view of my combined square and gauge block.

At one edge or end, when viewed laterally to its height, as best shown in Fig. 2, the body of the block tapers from the normal thickness of said body into a wedge formation 14 terminating with an arcuate contact surface 15, the surface being defined by straight sides extending from the base to the top of the block. The faces 16 of the wedge, being of equal width, are disposed at an acute angle to each other. The opposite end 16a of the block, as seen laterally to its length and as best shown in Fig. 2, is drawn to a radius described from a line bisecting the thickness of the body.

The base 12 of the block is provided with a centrally located shallow recess 17, leaving only a marginal area of said base for support of the block when placed on a flat surface such as that of a bench plate. It will be understood that such a bench plate is to possess an absolutely plane surface. The limited area of contact with such a plate, which area is limited to the marginal section of the base, is designed to facilitate lateral movement of the block upon the plane surface upon which it rests. To further facilitate the handling and the operative use of the block the body portion thereof is provided with a plurality of circular apertures 18 by reason of which apertures the weight of the block has been materially reduced without, however, affecting the dimensional stability thereof.

The block in the process of its manufacture is to be hardened and ground to the required dimension longitudinally, while the operative surfaces thereof are to be finished by lapping. This refers particularly to the base, to the top surface 13, and to the surfaces 16 of wedge 14. The importance of this requirement will be appreciated in view of the fact that the top surface 13 is to serve as a platform upon which gauge blocks 19 of the Johannson type may be stacked to a desired height, as shown in Fig. 3.

Figure 3:
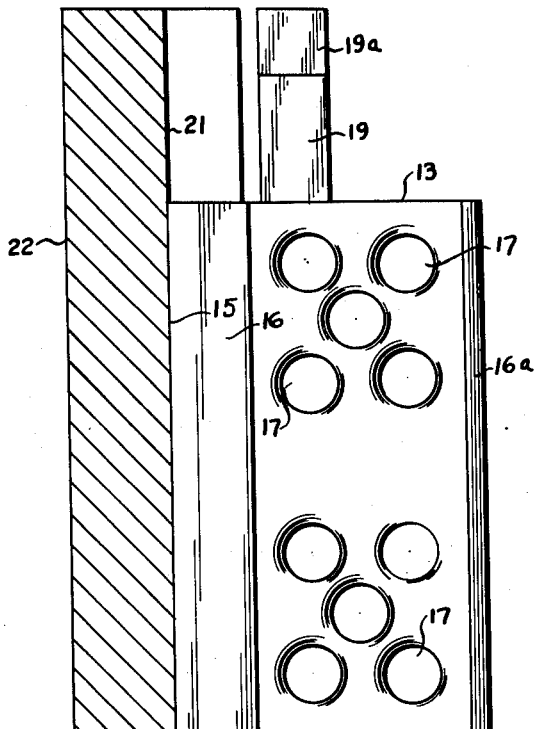
Fig. 3 is a side elevational view of the block in its operative position when used in conjunction with a plurality of standard gauge blocks.
Figure 4:
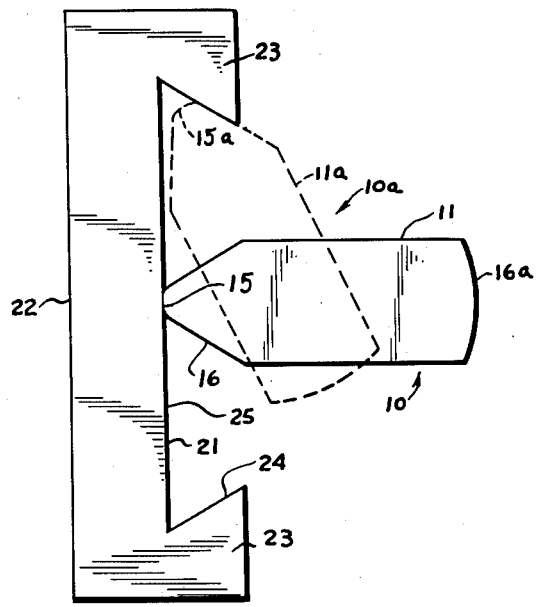
Fig. 4 is a top elevational view of my block as applied against an object to be checked for squareness.

The manner in which my block may be used is shown in Figs. 3 and 4 wherein my block, in a slightly modified form but still identified by numeral 10, is set up upon a flat surface 20. The working edge 15 is brought up against surface 21 of a work piece 22 in order that the squareness of said surface may be tested. It will be noted that the work piece includes two members 23 each having a face 24 which is set at an angle to a broad flat area 25. A block 10 shown in solid lines and the same block 10a shown in dotted lines but in a different position disclose the manner of employing said block for testing squareness of surfaces in a confined angular space.

It will be understood that the block described by me may be made in any desirable height and that a number of such blocks of varying heights may be stacked one upon another in such a manner that the base of one will rest upon the top of the lower one, and that said blocks may be supplemented by standard steel parallels until a specific height has been reached. For identification each block may be provided with inscription or numerals indicating the precise height of a respective block.

It will be further understood that some changes may be made in the shape and the structure generally of my said combined square and gauge block without departing from the inventive principle disclosed herein.

What I, therefore, wish to claim is as follows:

1. A combined square and gauge block comprising an oblong flat body made of one piece of steel stock, the body being bounded by two flat side surfaces disposed parallel to each other, each of the surfaces being vertical and rectangular, one surface being of the same form and area as the other, a flat base and a horizontally-disposed flat top surface, the top surface being of the same form and area as said base, a surface joining two side surfaces at one end as seen laterally to the height of the body, and an integrally-formed wedge extending from the two side surfaces and at the opposite end, the wedge including a vertical working edge for testing squareness of plane surfaces.

2. A combined square and gauge block comprising an oblong flat body made of one piece of steel stock, the body being bounded by two flat side surfaces disposed parallel to each other, both surfaces having the same area and the same form, each of the surfaces being vertical and rectangular, a flat base and a horizontally-disposed flat top surface, said top surface having the same area and the same form as the base, an arcuate surface joining the two surfaces at one end, as seen laterally, to the height of the body, and an integrally-formed wedge having in cross-section the form of a triangle, the base of the triangle being defined by a line joining the two flat side surfaces, the wedge including a vertical working edge drawn to a radius.

(References on following page)

References Cited in the file of this patent

UNITED STATES PATENTS

| | | |
|---|---|---|
| 1,008,261 | Harvie | Nov. 7, 1911 |
| 1,355,808 | Bryant | Oct. 19, 1920 |
| 1,383,979 | Bryant | July 5, 1921 |
| 2,315,004 | Painter | Mar. 30, 1943 |
| 2,474,577 | Gancer | June 28, 1949 |
| 2,536,401 | Victor | Jan. 2, 1951 |

FOREIGN PATENTS

| | | |
|---|---|---|
| 621,472 | Great Britain | Apr. 11, 1949 |

OTHER REFERENCES

Page 1050 of American Machinist, volume 86, September 17, 1942, published by McGraw-Hill Publishing Co., 330 W. 42nd St., New York 18, New York.

Page 238 of the magazine American Machinist, January 21, 1943, vol. 87, published by McGraw-Hill Publishing Co., 330 West 42nd Street, New York 18, N. Y.

"Taft-Pierce Handbook," published by the Taft-Pierce Mfg. Co., Woonsocket, R. I., copyright 1940, pages 106, 107, and 122.